United States Patent Office 3,247,019
Patented Apr. 19, 1966

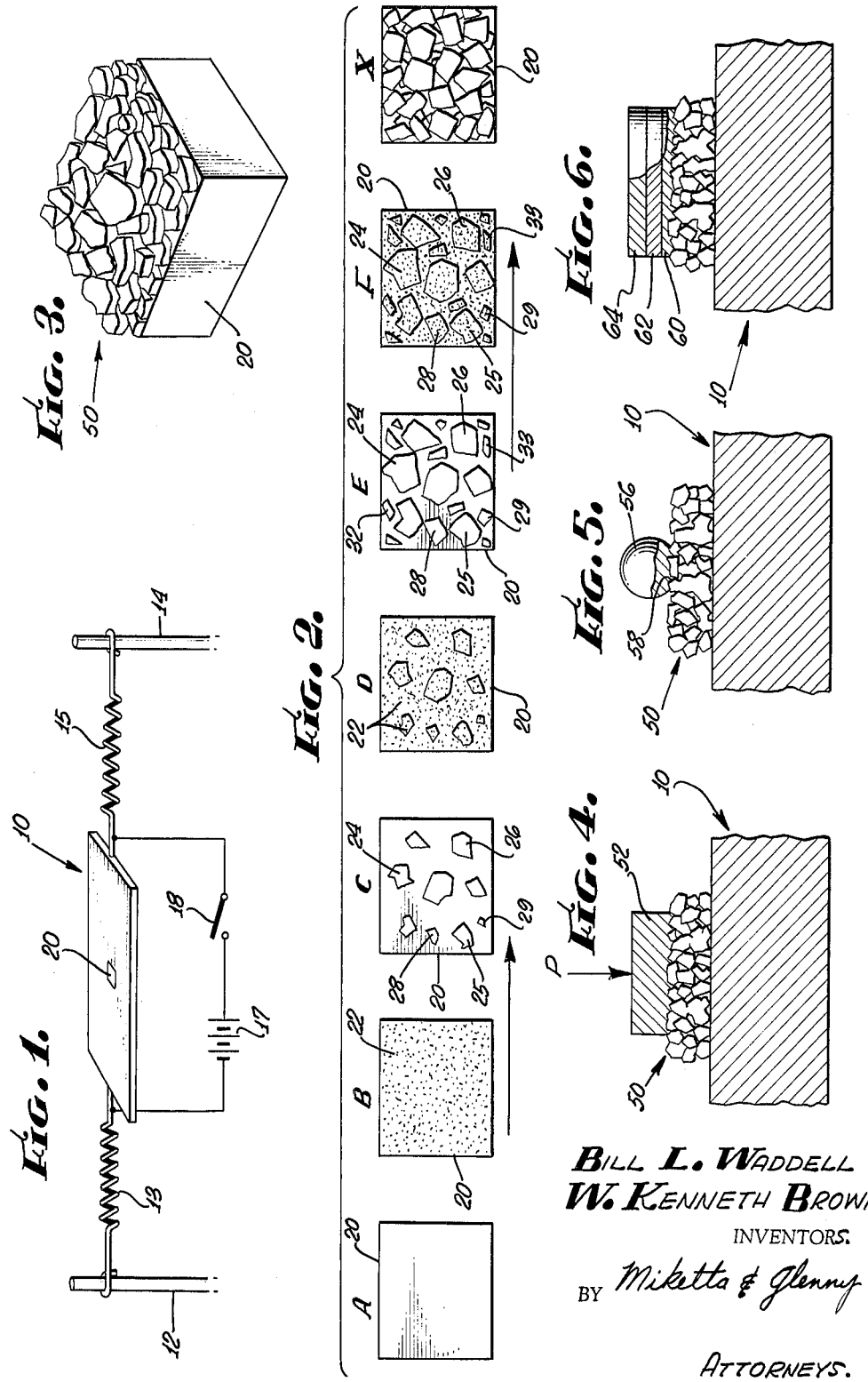

3,247,019
METHOD OF MAKING CRYSTALS AND
CAPACITORS FORMED THEREFROM
Bill L. Waddell, La Jolla, and Wilfred Kenneth Brown,
San Diego, Calif., assignors to Waddell Dynamics, Incorporated, San Diego, Calif., a corporation of California
Filed May 26, 1964, Ser. No. 370,289
15 Claims. (Cl. 117—217)

This application is a continuation-in-part of application Serial No. 189,093, filed April 20, 1962.

This invention relates generally to the making or growing of crystals having desired electrical and other characteristics, and in the preferred form of the invention, to the making of capacitors including crystals so made as the dielectric material.

It is known that certain crystalline materials have valuable dielectric properties. For example, many titanates and particularly barium titanate, have high dielectric constants and, below their Curie points, show the hysteresis loops characteristic of ferroelectrics. Additives have been found to alter the characteristics markedly, and high capacitance dielectrics which are virtually linear over substantial temperature ranges can be made.

In accordance with one aspect of the present invention, crystals are grown on a base member by applying to the base a very thin film of crystallizable dielectric material in essentially powdery form, heating the base and film to a temperature causing the material of the film to be converted into crystals bonded to the base, and repeating the steps of applying such film and heating the base and film to crystallize the latter until the thickness and porosity characteristics of the bonded crystal layer are as required for the specific purpose for which the crystals are intended.

The heating steps are preferably carried out by providing a base which is electrically conductive, and passing current therethrough. As pointed out in our earlier application above identified, the base may by preference be a metal such as platinum, which resists oxidation and reaction with the crystallizable dielectric material comprising barium titanate at the temperatures upwardly of 1200° C. employed, and of course having a melting point substantially above such temperatures.

From the mechanical viewpoint the crystal layer so formed and bonded to the base may be conveniently handled in further processes of manufacture or use with minimum risk of damage to the crystals, in contrast to crystalline dielectric material presently available in the form of thin sheets, which are very brittle and fragile. Thus the base, after it has served its purpose as a supporting means for the crystal layer thereon during later processing, may be removed as by being etched or dissolved by a suitable solvent.

From the electrical view point, and when the base member is itself a conductor, the base serves well as one electrode or plate of a capacitor employing the crystal layer as the dielectric. A second electrode is applied on the outer surface of the crystal layer in accordance with the invention, preferably in the manner to be described in detail hereinafter.

Application of the thin film of crystallizable material in powdery form is preferably accomplished by spraying an aqueous slurry of the material onto the base, the latter being desirably maintained at a temperature somewhat above 100° C. so that water in the slurry is immediately boiled off as the material lodges on the base. Crystallization of the material by heating it to a temperature in the range of approximately 1200° C.–1400° C. may be accomplished quickly because of the low mass of the thin film, and possible loss of desired additives thus minimized.

Successive cycles of application of the film referred to and crystallization thereof by heating produce a crystal layer whose porosity may be reduced to any practicable degree desired, thereby preventing the possibility of a short circuit through the crystalline dielectric when an outer electrode is later applied in molten form.

In making capacitors in accordance with the invention, the area of the outer electrode determines the capacitance, other factors being unchanged. Electrodes of silver, which may be mixed with glass frit as mentioned in the application above referred to, may be satisfactory where the electrode area is relatively large. However, the presence of the glass, with its generally lower dielectric constant, may unacceptably lower the capacitance, and may also introduce unacceptable variations exceeding tolerances of capacitance. For many applications gold is a preferred electrode material, and it must be bonded to the outer surface of the crystal layer in such a way as to exclude the possibility of an air gap between the electrode and the crystal layer. Thus the gold is applied in molten form, and its high surface tension causes it to form a small sphere, with only a small portion of its surface in bonding contact with the crystal. This arrangement is satisfactory for small areas, but becomes wasteful for larger areas. It is contemplated in accordance with the invention to use as an electrode a thin piece of sheet gold such as a disc, having an area needed to provide the desired capacitance, and to prevent it from assuming a sphere shape by providing an overlying disc of a material having a substantially higher melting point than gold, perferably platinum. An uppermost disc of gold is provided overlying the platinum, in order to prevent any tendency of the platinum disc, because its temperature coefficient of expansion is different from that of gold, to dislodge the lower gold disc from its bond with the crystal layer.

Accordingly it is a principal object of the invention to disclose and provide novel improvements in the making of crystals and in making capacitors including such crystals as their dielectric. Other objects are to provide a method of making crystals including a plurality of successive cycles of applying to a base a solution of crystallizable material and crystallizing such material on the base by heating the same; to provide a method of making a thin crystalline dielectric without filler or binder material, and with porosity reduced to as low a degree as desired; to provide a method of the above character which is simple and rapid, and is adaptable to making dielectrics of any desired thickness; to disclose a method of applying an electrode to a crystalline dielectric; and for other and additional objects and purposes as will be understood from the following description of a preferred embodiment of the invention taken in connection with the accompanying drawings in which:

FIG. 1 is a perspective view of a conductive base member on which crystals may be made in accordance with the invention, including means diagrammatically shown for heating the base member.

FIG. 2 is a succession of views of a very small portion of the base member as crystals are formed thereon.

FIG. 3 is a perspective view of a crystal layer as formed on the base member.

FIGS. 4, 5 and 6 are sectional views showing different methods of applying an electrode to the crystal layer to make a capacitor therefrom.

In FIG. 1 there is shown a typical arrangement by which crystals may be formed in accordance with the invention. A base member indicated generally at 10 is here illustratively shown as a strip carried by suitable support means such as uprights 12 and 14. In order to prevent undesirable bending or other deformation of base 10 during heating in accordance with the invention, means are provided to maintain base under tension, such means being here shown as including resilient members 13 and 15.

Heating of the base and of crystal forming material thereon as contemplated by the invention may be accomplished in any suitable manner. In the arrangement of FIG. 1, base 10 may be of electrically conductive material, and a source 17 may supply electric current through base 10 for heating the latter, under the control of switch 18. A small segment of the surface of base 10 is indicated generally at 20 and is shown elsewhere in the drawing on an enlarged scale to illustrate the invention in detail.

Thus FIG. 2 shows at A, B, C, D, E, F and X, successive steps in crystal growing on segment 20 as contemplated by the invention. Segment 20, here shown illustratively as generally rectangular in shape, is seen in view A before commencement of the process. In view B the surface of segment 20 is shown after applying thereto a film of crystal forming material in the form of fine particles 22 covering the surface. Application of film 22 may be accomplished by spraying a slurry or mixture of finely ground crystal forming material in a liquid vehicle such as water which is quickly volatilized after the film is deposited on the surface of segment 20.

View C of FIG. 2 shows segment 20 after heating of the film of crystal forming material to form a number of crystals of random size and arrangement bonded to the surface of segment 20. Thus the crystals include several relatively large crystals such as those indicated at 24, 25, and 26, and a number of smaller crystals such as 28 and 29, leaving between them random exposed portions of the surface of segment 20.

As indicated in view D, a film of crystal forming material is again applied to the segment 20 in the form of fine particles 22 covering not only the exposed portions of the surface of the segment but also the crystals already formed thereon as seen in view C. Heating of the film of particles 20 and already formed crystals causes further crystallization of the particles, as seen in view E. Thus, additional crystals are formed on the surface of segment 20 such as those indicated at 32 and 33, and some of the crystals already formed are enlarged as seen at 24, 25, 26, 28 and 29.

View F shows segment 20 after application of a third film of crystal forming particles 22 covering the portions of the surface of segment 20 still remaining exposed, and also covering the crystals already formed.

In accordance with the invention the successive steps of applying crystal forming material and heating thereof are repeated as may be necessary to produce a crystal structure having desired properties. Typically such structure will at least effectively cover the surface of segment 20, as in view X, showing a typical configuration after four or five cycles of application of crystal forming material and heating thereof.

In making capacitors in accordance with the invention, wherein the base is electrically conductive and a portion thereof forms one electrode or plate of the capacitor, it is of course necessary that subsequent adding of the other electrode not create a short circuit between electrodes through the crystalline structure constituting the dielectric of the capacitor. Furthermore, the dielectric itself must be thick enough to withstand application of an intended design voltage without breakdown. Thus, as seen in FIG. 3, the crystal layer indicated generally at 50 may include, at least in portions thereof, crystals overlying other crystals.

The invention contemplates application of an electrode on the outer surface of the crystal layer 50, the area of the layer covered by the electrode determining the capacitance, other factors being unchanged.

In FIG. 4 electrode 52 is applied to the crystal layer by heating the electrode to a temperature approaching but less than its melting point, whereby the electrode metal can be forced into contact with the uppermost crystals of the layer, under the influence of downward pressure P as indicated. It will be understood that such contact must be intimate between electrode 52 and the uppermost crystals, in order to prevent formation of an air gap effectively in series with the dielectric.

In FIG. 5 is shown application of an electrode 56 of metal such as gold having a high surface tension. The high surface tension is advantageous in minimizing the possibility of a short circuit by molten electrode metal contacting base 10 through any interstices in the crystal layer 50. Thus the electrode 56 tends to form a sphere when melted, contacting the uppermost crystals over a relatively small area 58, and such effective area of contact can be increased only by a very large increase in the amount of electrode metal used. This may be prohibitively large in terms of size and cost where large areas of contact are needed to obtain a desired capacitance.

For larger capacitances, laminated electrode application in accordance with FIG. 6 may be employed. As there shown, a lowermost lamina 60 of sheet electrode material such as gold is placed upon the crystal layer, overlying an area thereof as determined by the capacitance desired in the completed capacitor. In order to prevent lamina 60 from forming a sphere when heated to its melting point, a second lamina 62 of a metal having a higher melting point than the material of lamina 60 is placed over the first lamina. The second lamina 62 may for example be of platinum. If the materials of lamina 60 and lamina 62 have substantially different temperature coefficients of expansion, there may be a tendency for lamina 60 to be pulled loose from the crystal layer when lamina 60 is brought to its melting point and then cooled. Addition of a third lamina 64 overlying lamina 62 prevents such possibility when lamina 64 is of a material having a temperature coefficient of expansion comparable to that of lamina 60 and preferably equal thereto. Thus lamina 64 may itself be of gold in the exemplary form of the invention illustrated.

It may be noted in such arrangement that lamina 60 should be heated to its melting point without permitting lamina 64 to reach such point. This may be accomplished in accordance with the invention by passing current through base 10, so that heat transfer through the crystal layer raises the temperature of lamina 60 to its melting point before sufficient heat can reach lamina 64 to bring the latter to its melting point.

Making of crystals as disclosed herein, and making of capacitors using the crystals as the dielectric, may be accomplished economically and quickly be the methods of the present invention, and the invention thus permits empirical determination of the exact factors to produce crystals having characteristics conforming to requirements for a particular application. Among the important factors subject to control by the user are the temperature at which the crystals are formed, the time during which the material is held at such temperatures, the range of temperature change between successive applications of crystal forming material, and the composition of the crystal forming material or materials used. The high dielectric constant characteristic of, for example, barium titanate, may be availed of, but its hysteresis effect virtually eliminated, by control of the above factors, and capacitors having high linear capacitance thereby produced.

Crystalline dielectrics have been made in accordance with the invention by five successive applications of crystal forming material, each application followed by maintenance of the material for about six minutes at between 1200° and 1400° C. In general the powdery film of each application of the material should only just cover, to the eye, the base and crystals, if any, previously formed, and the minimum number of successive applications will be determined by the permissible porosity of the finished crystal layer in the light of the electrical, mechanical and other requirements of its intended function.

For example, the technique to be employed in applying the outer electrode may affect the permissible porosity. Thus in FIG. 4, electrode 52 is effectively swaged into the necessary intimate contact with the crystal layer, without bringing the electrode metal to its melting point, and there is hence virtually no risk that the electrode metal can contact the base through the crystal layer, no matter how porous the latter may be. The techniques contemplated by the present invention tend to minimize porosity in any event by reason of the repeated application of crystal forming material in the powdery film form above described.

We claim:

1. A method of forming a crystal layer on a base comprising:
    applying a thin film of titanium-containing crystallizable material to the surface of a base;
    heating said material to form therefrom crystals bonded to random portions of the base surface, other portions of the surface being exposed;
    applying a thin film of titanium-containing crystallizable material to the exposed portions of the base surface and to the crystals already formed on the base surface;
    heating said material and crystals whereby some already formed crystals are enlarged and additional crystals are formed in bonded relation to random parts of said exposed portions of the surface;
    and repeating said steps of applying a film and heating the material to form a crystal layer effectively coating the base.

2. The invention as stated in claim 1 wherein said base is electrically conductive and said heating steps include passing electric current through the base.

3. A method of making a capacitor having a crystalline dielectric grown on an electrically conductive base constituting one electrode of a finished capacitor, comprising the steps of:
    applying to the surface of an electrically conductive base a thin film of titanium-containing crystallizable material;
    heating said material to form therefrom crystals bonded to random portions of the base surface, other portions of the surface being exposed;
    applying a thin film of titanium-containing crystallizable material to the exposed portions and to the crystals already formed;
    heating said material and crystals whereby some already formed crystals are enlarged and additional crystals are formed in bonded relation to random parts of said exposed portions;
    repeating said steps of applying a film and heating the material to form a crystal layer having a porosity less than a predetermined value, said heating steps comprising passing current through the base;
    and applying an outer electrode to the outer surface of the crystal layer.

4. The invention as stated in claim 3 wherein said outer electrode is applied in molten form.

5. The invention as stated in claim 4 wherein the surface tension of the outer electrode in molten form is sufficiently high to preclude contacting the base through the crystal layer.

6. The invention as stated in claim 5 wherein said outer electrode is gold.

7. The invention as stated in claim 6 wherein said gold electrode is initially in sheet form and including the steps of applying a lamina of a second outer electrode material overlying the gold sheet, said last named material having a higher melting point than gold, and heating the gold sheet to its melting point.

8. The invention as stated in claim 7 wherein said last named material is platinum.

9. The invention as stated in claim 6 wherein said gold electrode is initially in sheet form and including the steps of adding a first lamina of a second outer electrode material overlying the gold sheet, said last named material having a higher melting point than gold, adding a second lamina of gold overlying the first lamina, and heating the gold sheet to its melting point.

10. The invention as stated in claim 3 wherein said outer electrode is applied by heating it to a temperature slightly below its melting point and forcing it into intimate contact with the crystal layer.

11. The invention as stated in claim 3 wherein said films are applied from an aqueous slurry and the base is maintained at a temperature of at least the boiling point of water during the applying steps.

12. A method of forming a metallic electrode bonded to a crystalline material having a melting point substantially higher than the electrode melting point comprising:
    placing a first lamina of electrode metal on the surface of a crystalline material;
    placing a second lamina of electrode metal in overlying relation with the first lamina, the metal of the second lamina having a higher melting point than that of the first lamina;
    and applying heat to the crystalline material to raise the first lamina to substantially its melting point.

13. The invention as stated in claim 12 including the step, prior to applying heat, of placing a third lamina of electrode material in overlying relation with the second lamina, the first and third laminae having substantially equal temperature coefficients of expansion.

14. The invention as stated in claim 13 wherein said first and third laminae are of gold.

15. The invention as stated in claim 14 wherein said second lamina is of platinum.

References Cited by the Examiner

UNITED STATES PATENTS

| | | | |
|---|---|---|---|
| 2,702,427 | 2/1955 | Roberts | 317—262 |
| 2,759,854 | 8/1956 | Kilby | 117—217 |
| 3,002,861 | 10/1961 | Suchoff | 106—299 |
| 3,114,868 | 12/1963 | Feldman | 117—217 |

JOSEPH B. SPENCER, *Primary Examiner.*

WILLIAM D. MARTIN, *Examiner.*